US008494573B2

(12) United States Patent
Hellström et al.

(10) Patent No.: US 8,494,573 B2
(45) Date of Patent: Jul. 23, 2013

(54) RADIO COMMUNICATION SYSTEM FOR PROVIDING BOTH VOICE AND DATA COMMUNICATION SERVICES OVER RADIO COMMUNICATION CHANNELS AND A METHOD FOR USE IN A RADIO COMMUNICATION SYSTEM

(75) Inventors: Peter Hellström, Linköping (SE); Christer Sjöström, Linköping (SE)

(73) Assignee: Saab AB, Linköping (SE)

( * ) Notice: Subject to any disclaimer, the term of this patent is extended or adjusted under 35 U.S.C. 154(b) by 1245 days.

(21) Appl. No.: 12/000,531

(22) Filed: Dec. 13, 2007

(65) Prior Publication Data
US 2008/0176557 A1 Jul. 24, 2008

(30) Foreign Application Priority Data
Dec. 13, 2006 (EP) .................................... 06126048

(51) Int. Cl.
*H04M 1/00* (2006.01)
(52) U.S. Cl.
USPC ..................... 455/550.1; 455/435.1; 455/108; 370/348; 370/395.2; 370/352
(58) Field of Classification Search
USPC ............ 455/108, 46, 47, 156.1, 550.1, 435.1; 370/348, 395.2, 33, 352
See application file for complete search history.

(56) References Cited

U.S. PATENT DOCUMENTS

| 5,115,233 | A | * | 5/1992 | Zdunek et al. ................ 370/348 |
| 5,448,768 | A | * | 9/1995 | Zinser ........................... 455/108 |
| 5,959,568 | A | * | 9/1999 | Woolley ......................... 342/42 |
| 2003/0171130 | A1 | | 9/2003 | Sajatovic |
| 2003/0211846 | A1 | * | 11/2003 | Nagpal et al. ................. 455/434 |
| 2005/0047388 | A1 | * | 3/2005 | Takabatake et al. .......... 370/349 |
| 2005/0265350 | A1 | * | 12/2005 | Narasimha et al. ........ 370/395.2 |
| 2007/0049344 | A1 | * | 3/2007 | Van Der Velde et al. ..... 455/560 |
| 2007/0088467 | A1 | | 4/2007 | Knotts |
| 2009/0154446 | A1 | * | 6/2009 | Adler et al. .................... 370/350 |
| 2009/0268619 | A1 | * | 10/2009 | Dain et al. ..................... 370/252 |

FOREIGN PATENT DOCUMENTS

| EP | 1317075 A2 | 6/2003 |
| GB | 2393614 A | 3/2004 |

OTHER PUBLICATIONS

European Search Report—Jun. 25, 2007.

* cited by examiner

*Primary Examiner* — Manpreet Matharu
(74) *Attorney, Agent, or Firm* — Venable LLP; Eric J. Franklin

(57) ABSTRACT

A radio communication system including a system computer connected to a radio communication device including a radio communication antenna and an audio management system via a data bus. The audio management system is connected to a user communication device. The system computer is arranged to switch between a data communication service and a voice communication service upon receiving a signal from the radio communication device indicating that a carrier on a predetermined fixed frequency has been detected or has ceased to be detected by the radio communication device, or from the audio management system indicating that a request for a predetermined fixed frequency voice communication service has been detected or has ceased to be detected by the audio management system.

18 Claims, 3 Drawing Sheets

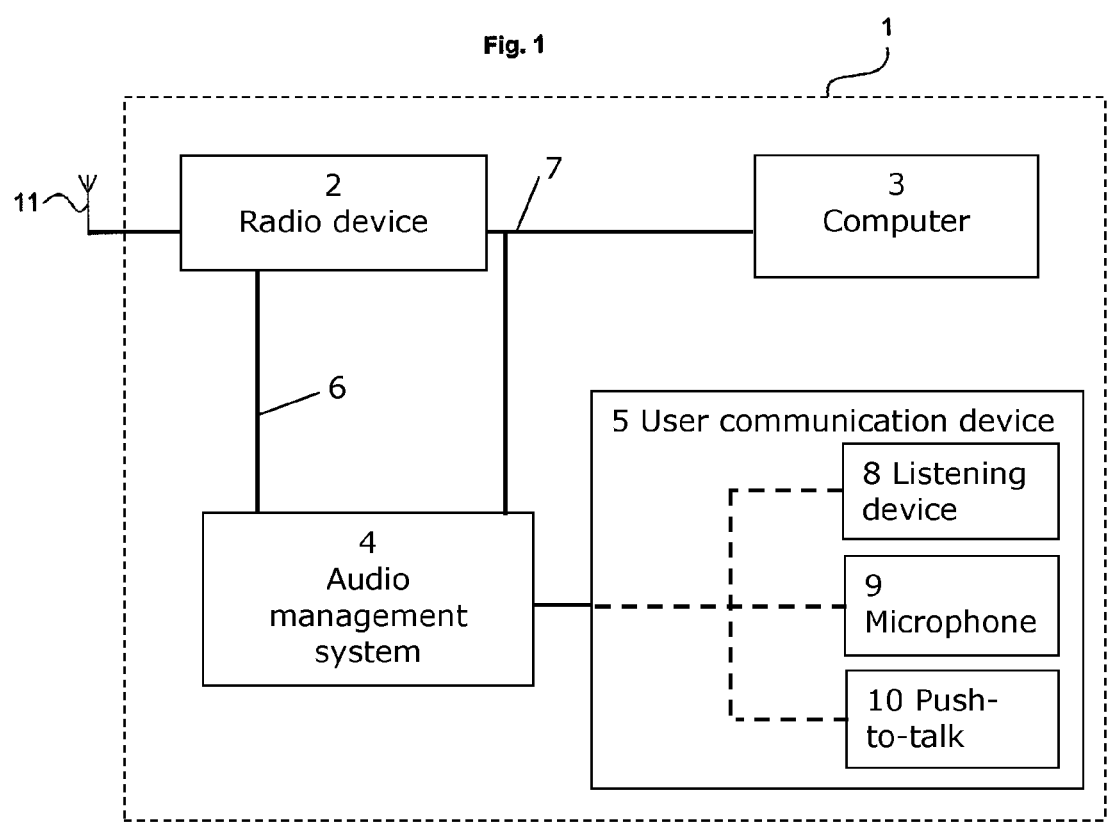

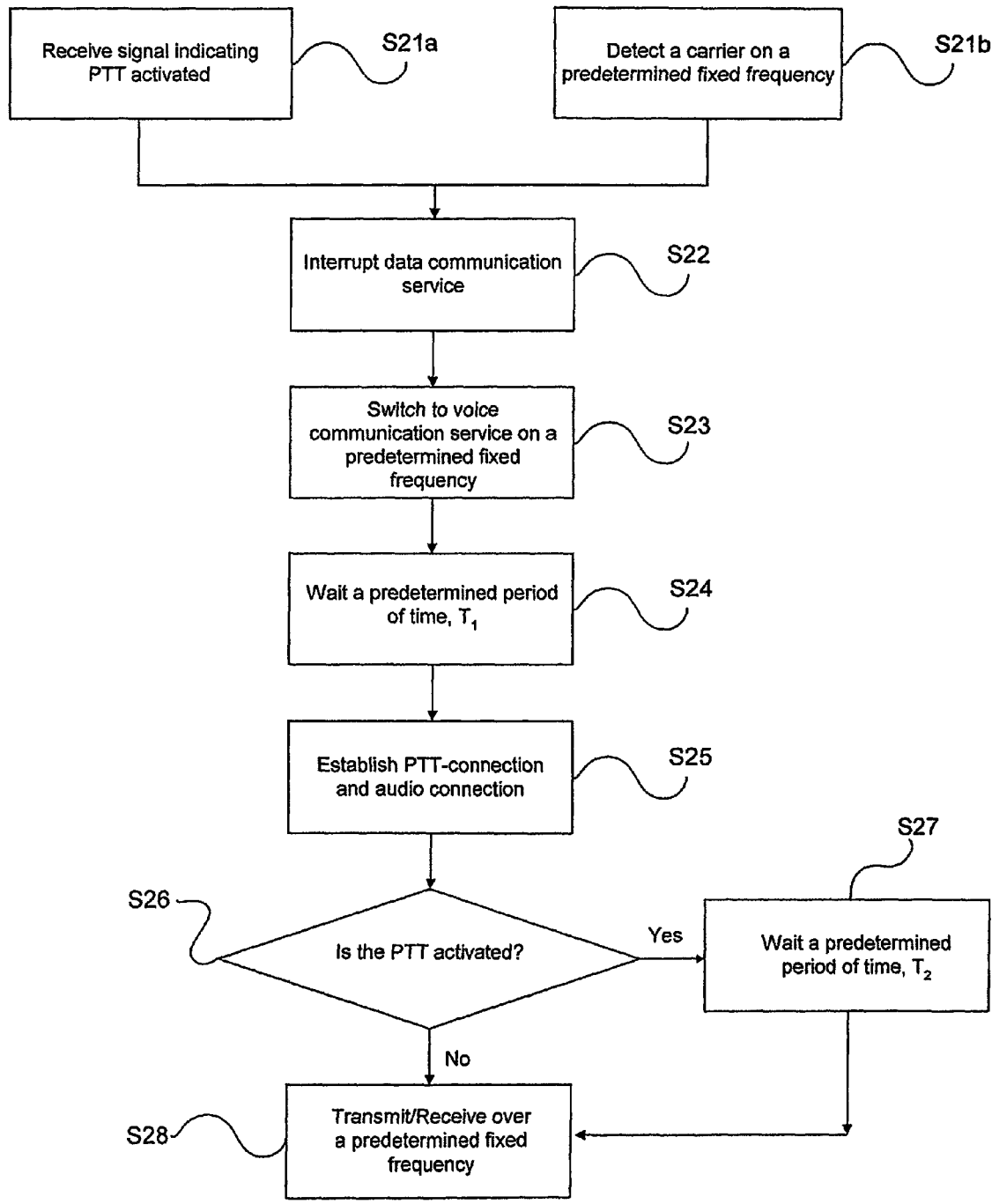

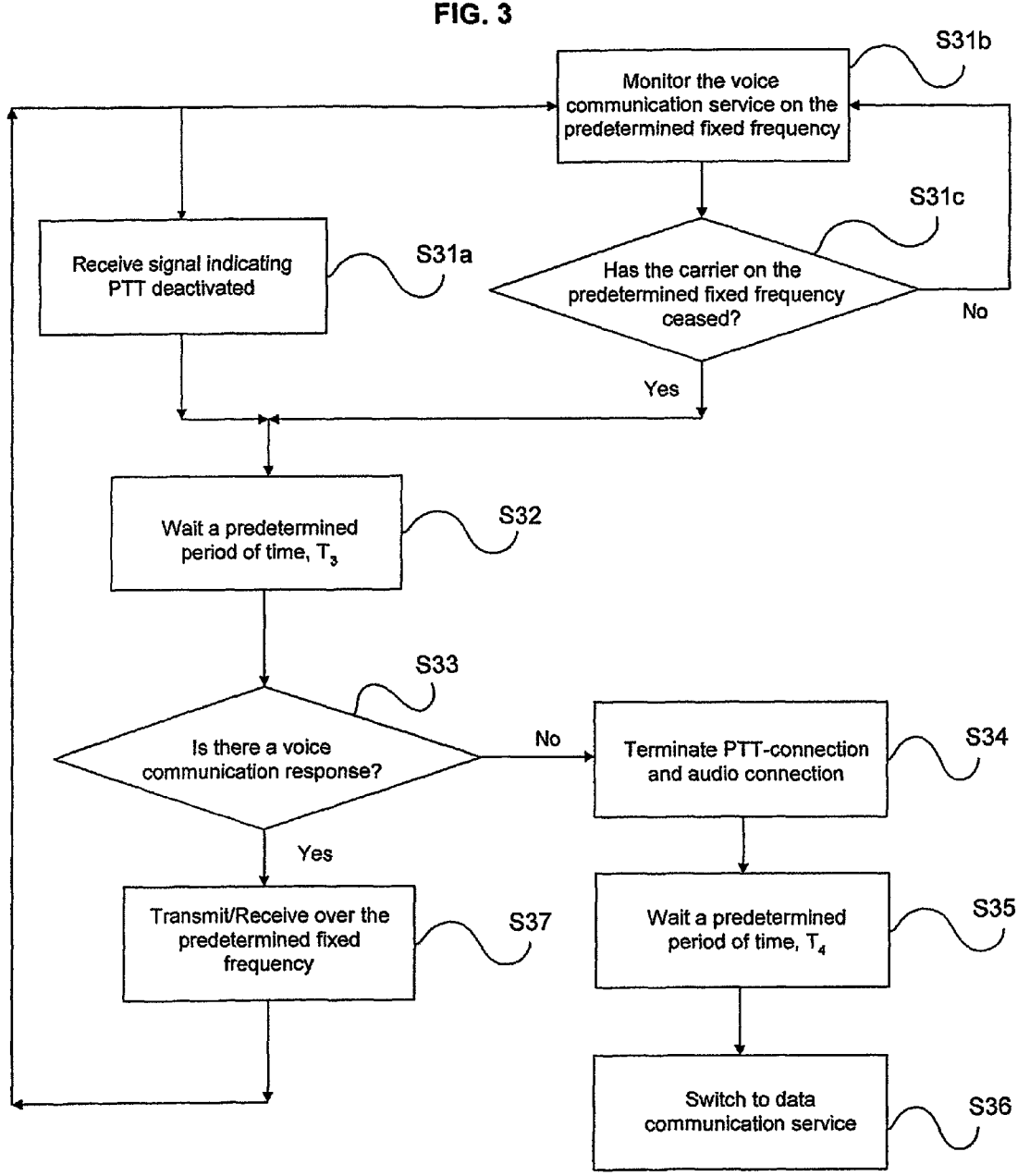

RADIO COMMUNICATION SYSTEM FOR PROVIDING BOTH VOICE AND DATA COMMUNICATION SERVICES OVER RADIO COMMUNICATION CHANNELS AND A METHOD FOR USE IN A RADIO COMMUNICATION SYSTEM

TECHNICAL FIELD

The present invention relates to radio communication systems in general. The present invention also relates to a method for use in a radio communication system.

BACKGROUND OF THE INVENTION

The use of tactical voice communication in military fighter aviation today normally requires simultaneous availability of two voice communication services. An example of this is the following setup, one voice service or channel is used for the communication between fighter divisions and a military command central (a fighter division being a fighting unit comprising a group of fighter aircrafts), and a second voice service or channel is used for the communication within each fighter division, that is, between the fighter aircrafts in each group. In order to provide these two simultaneous voice communication services, the fighter aircrafts normally needs to be designed for and fitted with two voice radio communication devices.

Because the advanced technology and electronics in modern fighter aircrafts requires real-time update information, tactical data communication services is also required. Tactical data communication services, both between the fighter aircrafts and between the fighter division and the military command central, is therefore necessary in order for the fighter division to successfully carry out its mission or task.

This normally requires designing and installing a third radio communication device, since both of the other radio communication devices are reserved for voice communication and therefore are unavailable for tactical data communication. The costs associated with implementing a third radio communication device in a fighter aircraft are considerable and would require extensive research and development even before the arduous and time-consuming task of integrating it into the fighter aircraft.

OBJECT OF THE INVENTION

It is an object of the present invention to provide a voice and data communication services in a radio communication device.

SUMMARY OF THE INVENTION

The object of the present invention is achieved by providing a radio communication system comprising a system computer connected to a radio communication device provided with a radio communication antenna and an audio management system via a data bus, the audio management system being connected to a user communication device.

The system computer is arranged to switch between a data communication service and a voice communication service upon receiving a signal from the radio communication device indicating that a carrier on a predetermined fixed frequency has been detected or has ceased to be detected by the radio communication device, or from the audio management system indicating that a request for a predetermined fixed frequency voice communication service has been detected or has ceased to be detected by the audio management system.

The object of the invention is further achieved by a method for use in a radio communication system comprising a system computer connected to a radio communication device arranged with a radio communication antenna and an audio management system via a data bus, said audio management system being connected to a user communication device, characterized in comprising the step of receiving, from the radio communication device, a signal in said system computer indicating that a carrier on a fixed frequency has been detected by said radio communication device, or, from the audio management system, a signal in said system computer indicating that a request for a predetermined fixed frequency voice communication service has been detected by said audio management system, and the step of switching to a voice communication service by the system computer in response to receiving one of said signals.

An advantage of the above described invention is that the present invention can be implemented in an already existing radio communication system present in military fighter aircrafts today without requiring arduous and time-consuming development, redesign and installation of new equipment. This also renders the present invention inexpensive and especially suitable for application.

The method can also comprise the step of switching to a normal operational mode when the signals have not been detected for a predetermined time interval, wherein the normal operational mode preferably is a data communication service. In the radio communication system, this feature allows for a tactical data communication service with real-time update information.

Preferably the method can also comprise the step of continuously monitoring the predetermined fixed frequency in order to detect or cease to detect a carrier on the predetermined fixed frequency. This feature enables the system computer to automatically switch between a data communication service and a voice communication service.

Preferably the method also comprises the step of having the predetermined fixed frequency being a hailing frequency. For this purpose the radio communication device preferably comprises a hailing function.

Preferably the method also comprises the step of establishing or terminating an audio connection between the radio communication device and the user communication device, in response to said switching between data and voice communication services. This advantageously provide for the radio communication system to easily switch between a data communication service and a voice communication service.

Preferably the method also comprises the step of establishing or terminating a PTT-connection (PTT, Push-To-Talk) between the radio communication device and a PTT-device comprised in said user communication device, in response to said switching between data and voice communication services. This feature further provides for the radio communication system to easily switch between a data communication service and a voice communication service.

Preferably the method also comprises the step of transmitting a signal to the audio management system indicating a request for a predetermined fixed frequency voice communication service when activating the PTT-device comprised in the user communication device. This feature advantageously enables voice and data communication services over the same radio communication device without the need for additional manoeuvres by an operator of a fighter aircraft than the standard PTT-procedure.

Preferably the method also comprises the step of generating and sending a waiting tone to a listening device comprised in the user communication system. An advantage with this feature in the radio communication system is that it prohibits, for example, a operator from starting to talk while the predetermined fixed frequency voice service is not yet established.

Preferably the audio management system is arranged with a separate audio connection to the radio communication device. This feature further provides for the radio communication system to easily switch between a data communication service and a voice communication service.

Preferably the user communication device further comprises a microphone.

The object of the invention is further achieved by a computer program product for use in the system computer in the radio communication system as previously described, wherein the system computer comprises computer readable code means, which when run in the system computer causes the radio communication system to perform any of the previously described steps.

Preferably the computer program product also comprises code means which is stored on a readable storage medium.

BRIEF DESCRIPTION OF THE DRAWINGS

FIG. 1 shows an embodiment of the present invention;
FIG. 2 shows a flowchart illustrating switching from a data communication service to a voice communication service according to an embodiment of the present invention;
FIG. 3 shows a flowchart illustrating switching from a voice communication service to a data communication service according to an embodiment of the present invention.

DESCRIPTION OF THE PREFERRED EMBODIMENTS

FIG. 1 illustrates a radio communication system 1 according to the present invention. A radio communication antenna 11 is used for transmitting/receiving incoming and outgoing radio communication transmissions to and from a radio communication device 2 in the radio communication system 1. The radio communication device 2 is capable of both analogue or digital voice and data communication.

Although primarily used for tactical voice or real-time data communication services, which means that the voice or data transmission could, for example, include text encryption, interference protection etc., the radio communication device 2 is also arranged to detect a carrier (i.e. transmission) on a fixed frequency. As an example, this fixed frequency could be the hailing frequency. Via a data bus 7, typically 1553B, the radio communication device 2 provides a real time data communication link to an on-board system computer 3 (SC). The real-time communication link is used for handling tactical data communication. The data communication service is the default or normal operational mode of the radio communication system according to the present invention.

The radio communication device 2 also continuously provides information about its own transmission status to the on-board system computer 3 (SC).

The on-board system computer 3 is arranged to control the radio communication device 2 and an audio management system 4 (AMS) in order to be able to send/receive both voice and data communication, as will be described in the following.

The audio management system 4, also connected to the on-board system computer 3 via the data bus 7, is a controllable audio switch, which can send and receive audio transmissions to and from the radio communication device 2 via an audio connection 6.

Connected to the audio management system 4 is a user communication device 5 that enables an operator to listen and receive voice communication transmissions. The user communication device 5 includes a listening device 8, for example, headphones or a speaker etc., a microphone 9 and also a PTT 10, that is, a Push-To-Talk device, which typically is a button that is pressed down when a user wish to transmit voice communication.

The audio management system 4 controls the audio transmissions to and from the radio communication device 2 based upon signals from the PTT 10 in the user communication device 5.

In the following the use of the invention will be described in more detail, by way of an exemplary embodiment, as described above and shown in FIG. 1, and with reference to the flowcharts in the appended drawings, FIG. 2-3.

The procedure of FIG. 2 may be started in two different ways. One way is according to a first embodiment of the invention, which is when an operator of a fighter aircraft, which includes said radio communication system 1, wants to transmit voice using the present invention. The operator then uses the radio communication system 1 in the same way as if it was used exclusively for voice communication, that is, he simply presses down the PTT 10 in the user communication device 5.

The other way is according to a second embodiment of the invention, wherein a sent out call to an operator of a fighter aircraft, which includes said radio communication system 1, is received. The operator is then connected in the same way as if it was used exclusively for voice communication, that is, the received voice transmission is forwarded to the listening device 8.

The first embodiment is shown in step S21a in the flowchart in FIG. 2 and indicates that the PTT 10 has been activated, i.e. the PTT-button is pressed down and held in.

The second embodiment is shown in step S21b in the flowchart in FIG. 2 and indicates that a carrier on a predetermined fixed frequency has been detected, i.e. a voice transmission has been detected and is being received.

In the next step, step S22, the on-board system computer 3 interrupts the on-going data communication service upon either receiving a signal indicating that the PTT 10 has been activated or receiving a signal indicating that a carrier on a predetermined fixed frequency has been detected.

In step S23, the on-board system computer 3 sends a command signal to the radio communication device 2 to immediately switch to a predetermined voice communication service on a predetermined fixed frequency.

In step S24, the on-board system computer 3 then waits a predetermined period of time, $T_1$, in order for the radio communication device 2 to switch to the predetermined voice communication service, the waiting period of $T_1$ depending on the performance of the radio communication device 2.

After that, in step S25, the on-board system computer 3 sends a command signal to the audio management system 4 arranging it so that a PTT-connection is established and an audio connection is set up between the radio communication device 2 and the user communication device 5, operated by the operator.

In step S26, if the procedure was started with step S21b according to the second embodiment the procedure immediately goes to step S28, but if the procedure was started with step S21a according to the first embodiment, the procedure goes to step S27 and waits for a predetermined period of time before going to step S28.

In step S27, the on-board system computer 3 waits a predetermined period of time, $T_2$, in order for the radio communication device 2 to generate a carrier that will trig a detection in a receiving radio communication device 2 and allow for a receiving radio communication device to switch operational mode from the data communication service to the voice communication service. The waiting period $T_2$ depends on the performance of the radio communication devices 2 in the overall communication setup.

In step S28, the radio communication system 1 is ready to start transmitting plain voice over the predetermined fixed frequency channel.

If the procedure was started with step S21a according to the second embodiment, during both predetermined periods of time, $T_1$ and $T_2$, the on-board system computer 3 controls the audio management system 4 so that a waiting tone is generated in the listening device 8 in the user communication device 5.

The voice communication service could either be an analogue plain text channel (non-encrypted) or an encrypted channel. The requirement, however, is that it uses the predetermined fixed frequency.

During the process of switching from the data communication service to the voice communication service in a radio communication system 1 according to the present invention, whether initiated by a signal indicating that a PTT 10 has been activated (Step 21a) or initiated by the detection of a carrier on a predetermined fixed frequency (Step 21b), the radio communication system 1 is not susceptible to and can not be interrupted by any changes of the status of the activation of the PTT 10 or the detection of a carrier.

The procedure of FIG. 3 may be started in two different ways. One way is according to a third embodiment of the invention, which is when an operator of a fighter aircraft, which includes said radio communication system 1, wants to stop voice transmission using the present invention. The operator then uses the radio communication system 1 in the same way as if it was used exclusively for voice communication, that is, he simply releases the PTT 10 in the user communication device 5.

The other way is according to a fourth embodiment of the invention, wherein during the transmission using the voice communication service on the predetermined fixed frequency, the on-board system computer 3 monitors the carrier information provided by the radio communication device 2 via the data bus 7. The on-board system computer 3 operator is then able to detect when the voice transmission has stopped being received, that is, the carrier on the predetermined fixed frequency has ceased.

The third embodiment is shown in step S31a in the flowchart in FIG. 3 and indicates that the PTT 10 has been deactivated, i.e. the PTT-button is released.

The fourth embodiment is shown in the steps S31b and S31c in the flowchart in FIG. 3, wherein step S31b indicates that a carrier on a predetermined fixed frequency is continuously monitored and S31c indicates whether or not the carrier on a predetermined fixed frequency has ceased.

In the next step, step S32, the on-board system computer 3 waits a predetermined period of time, $T_3$. The predetermined period of time, $T_3$, is adjusted to correspond to the time it takes for an operator to respond to a sent out call and is also provided in order to avoid rapid and frequent switching between the data and voice communication services. In step S33, if a voice communication response is received during or after the predetermined period of time, $T_3$, in step S32, the procedure immediately goes to step S37, but if no voice communication response is received the procedure goes to step S34.

In step 37, another voice communication transmission or an activation of the PTT 10, during the predetermined period of time $T_3$ (step S32), the voice communication service over the predetermined fixed frequency continues.

In step S34, the on-board system computer 3 will send out command signals to the radio communication device 2 and the audio management system 4 to go back to its original settings.

This is done by first having the on-board system computer 3 send a command signal to the audio management system 4 to terminate the PTT and audio connection to the radio communication device 2.

Secondly, in step S35, the on-board system computer 3 waits for a predetermined period of time, $T_4$, in order for the audio management system 4 to be reset. The predetermined period of time, $T_4$, depends on the performance of the audio management system 4.

In step S36, after the waiting period, $T_4$, the on-board system computer 3 sends a command signal to the radio communication device 2 to immediately switch back to and resume the data communication service.

During the process of switching from the voice communication service to data communication service in the radio communication system 1 according to the present invention, as described previously in the steps S34 to S36, the radio communication system 1 is not susceptible to and can not be interrupted by any changes in status of the PTT 10 or in the detection of a carrier.

As described above the present invention allows an operator to activate and deactivate the voice communication service, thereby also allowing the data communication service to utilize the radio communication device 1 while the voice communication service is deactivated, without any additional manoeuvres from the operator than the standard PTT-procedure (Push-To-Talk).

The system computer 3 comprises a computer programme product and code means for controlling the present invention according to any of the step in the previously mentioned embodiments.

An example of a suitable maximum waiting period for connecting the voice communication service upon receiving signal indicating that the PTT has been activated is estimated to around 300 ms, that is, without considering the waiting period, $T_2$, for the receiving radio communication system to detect the carrier and switch operational mode to the voice communication service.

An example of a suitable maximum waiting period before connecting the voice communication service upon receiving a carrier (transmission) is estimated to around 700 ms.

Accordingly, an example of a suitable total maximum waiting time for connecting and establishing a voice communication service is about 1 second, which e.g. could be the time it takes for an operator in a fighter aircraft to start to transmit a voice communication to the time an operator in another fighter aircraft receives said voice communication transmission.

Consequently, an example of a suitable a total maximum waiting time before resuming the data communication service after having ended a voice communication service is also about 1 second.

The use of the present invention is aimed at fighter aircrafts, but can easily be adapted to other areas where both voice and data communication services are needed such as, for example, boats, submarines, space vehicles etc.

The invention claimed is:

1. A radio communication system, comprising:
    a system computer;
    a radio communication device comprising a radio communication antenna, a voice communication service comprising a voice communication channel and a data communication service;
    an audio management system;
    a user communication device connected to the audio management system; and
    a data bus connecting the system computer, the radio communication device and the audio management system;
    wherein a normal operational mode of the radio communication system is the data communication service, wherein said system computer is arranged to switch the radio communication device from said normal operational mode to the voice communication service through the voice communication channel on a predetermined fixed frequency upon receiving a signal from the radio communication device indicating that a carrier on the predetermined fixed frequency has been detected or a signal from the audio management system indicating that a request for a predetermined fixed frequency voice communication service has been detected, and from said voice communication service on a predetermined frequency to said normal operational mode upon receiving a signal from the radio communication device indicating that a carrier on a predetermined fixed frequency has ceased to be detected by said radio communication device or a signal from the audio management system indicating that a request for a predetermined fixed frequency voice communication service has ceased to be detected by said audio management system.

2. The radio communication system according to claim 1, wherein said radio communication device continuously monitors said predetermined fixed frequency in order to detect or cease to detect a carrier on said predetermined fixed frequency.

3. The radio communication system according to claim 1, wherein said predetermined fixed frequency is a hailing frequency.

4. The radio communication system according to claim 1, wherein said system computer in response to said switching between data and voice communication services, is arranged to control said audio management system to establish or terminate an audio connection between said radio communication device and said user communication device.

5. The radio communication system according to claim 1, wherein said system computer in response to said switching between data and voice communication services, is arranged to control said audio management system to establish or terminate a PTT-connection between said radio communication device and a PTT-device comprised in said user communication device.

6. The radio communication system according to claim 5, wherein said PTT-device is arranged to transmit a signal to said audio management system indicating a request for a predetermined fixed frequency voice communication service when activated.

7. The radio communication system according to claim 1, wherein said audio management system is arranged to generate and send a waiting tone to a listening device comprised in said communication system.

8. The radio communication system according to claim 1, wherein said audio management system is arranged with a separate audio connection to said radio communication device.

9. The radio communication system according to claim 1, wherein said user communication device further comprises a microphone.

10. A method for use in a radio communication system comprising a system computer connected to a radio communication device comprising a radio communication antenna, a voice communication service comprising a voice communication channel and a data communication service, and an audio management system via a data bus, said audio management system being connected to a user communication device, the method comprising:
    operating the radio communication system in a normal operational mode of data communication utilizing the data communication service;
    receiving, from the radio communication device, a signal in said system computer indicating that a carrier on a fixed frequency has been detected by said radio communication device, or, from the audio management system, a signal in said system computer indicating that a request for a predetermined fixed frequency voice communication service has been detected by said audio management system; and
    switching the radio communication device from the normal operational mode to the voice communication service through the voice communication channel on the predetermined fixed frequency by said system computer in response to receiving one of said signals and from said voice communication service on a predetermined frequency to said normal operational mode upon receiving a signal from the radio communication device indicating that a carrier on a predetermined fixed frequency has ceased to be detected by said radio communication device or a signal from the audio management system indicating that a request for a predetermined fixed frequency voice communication service has ceased to be detected by said audio management system.

11. The method according to claim 10, further comprising:
    switching to the normal operational mode when said signals have not been detected for a predetermined time interval.

12. The method according to claim 10, further comprising:
    monitoring continuously said predetermined fixed frequency.

13. The method according to claim 10, further comprising:
    having said predetermined fixed frequency being a hailing frequency.

14. The method according to claim 10, further comprising:
    establishing or terminating an audio connection between said radio communication device and said user communication device.

15. The method according to claim 10, further comprising:
    establishing or terminating a PTT-connection between said radio communication device and a PTT-device comprised in said user communication device.

16. The method according to claim 15, further comprising:
    transmitting a signal to said audio management system indicating a request for a predetermined fixed frequency voice communication service when activating said PTT-device comprised in said user communication device.

17. The method according to claim 10, further comprising:
    generating and sending a waiting tone to a listening device comprised in said communication system.

18. A computer program product, comprising:

a non-transitory computer readable medium; and computer program instructions recorded on the computer readable medium and executable by a processor for carrying out a method for use in a radio communication system comprising a system computer connected to a radio communication device comprising a radio communication antenna, a voice communication service comprising a voice communication channel and a data communication service, and an audio management system via a data bus, said audio management system being connected to a user communication device, the method comprising:

operating the radio communication system in a normal operational mode of data communication utilizing the data communication service;

receiving, from the radio communication device, a signal in said system computer indicating that a carrier on a fixed frequency has been detected by said radio communication device, or, from the audio management system, a signal in said system computer indicating that a request for a predetermined fixed frequency voice communication service has been detected by said audio management system; and switching the radio communication device from the normal operational mode to the voice communication service through the voice communication channel on the predetermined fixed frequency by said system computer in response to receiving one of said signals and from said voice communication service on a predetermined frequency to said normal operational mode upon receiving a signal from the radio communication device indicating that a carrier on a predetermined fixed frequency has ceased to be detected by said radio communication device or a signal from the audio management system indicating that a request for a predetermined fixed frequency voice communication service has ceased to be detected by said audio management system.

\* \* \* \* \*